(12) United States Patent
Deneire

(10) Patent No.: US 8,707,750 B2
(45) Date of Patent: Apr. 29, 2014

(54) METHOD AND APPARATUS TO DEFORM THE CROSS SECTION OF ONE OR MORE LONGITUDINAL SECTIONS OF AN OBLONG OBJECT

(75) Inventor: Michel Deneire, Ardooie (BE)

(73) Assignee: Darvan Invest N.V., Adrooie (BE)

( * ) Notice: Subject to any disclaimer, the term of this patent is extended or adjusted under 35 U.S.C. 154(b) by 1078 days.

(21) Appl. No.: 12/530,811

(22) PCT Filed: Mar. 11, 2008

(86) PCT No.: PCT/EP2008/001914
§ 371 (c)(1),
(2), (4) Date: Sep. 11, 2009

(87) PCT Pub. No.: WO2008/110333
PCT Pub. Date: Sep. 18, 2008

(65) Prior Publication Data
US 2010/0065145 A1 Mar. 18, 2010

(30) Foreign Application Priority Data
Mar. 14, 2007 (BE) .................................. 2007/0109

(51) Int. Cl.
*B21J 5/00* (2006.01)
(52) U.S. Cl.
USPC ............................... 72/354.2; 72/308; 72/399
(58) Field of Classification Search
USPC ............. 72/305, 308, 309, 311, 353.6, 354.2, 72/355.2, 355.4, 377, 398, 399, 355.6; 140/72, 88, 105; 425/292; 29/4.6; 264/294, 320
See application file for complete search history.

(56) References Cited

U.S. PATENT DOCUMENTS 2,041,860 A 5/1936 Ragan
3,628,574 A * 12/1971 Ramseier ........................ 140/72
(Continued)

FOREIGN PATENT DOCUMENTS

BE 500123 A 1/1951
CH 46568 A 3/1910
(Continued)

OTHER PUBLICATIONS

JPO Office Action mailed Jul. 3, 2012 for corresponding Japanese patent application.
(Continued)

*Primary Examiner* — Shelly Self
*Assistant Examiner* — Leonel Vasquez
(74) *Attorney, Agent, or Firm* — Symbus Law Group LLC; Clifford D. Hyra

(57) ABSTRACT

The invention relates to such a method and apparatus, as well as to the resulting deformed object out of a relatively hard material such as e.g. a metal or plastic wire in which an undeformed section (2) is clamped near its ends (3, 4) and is subsequently upset in a controlled way by an axial pressure force (22) to a predefined shortened and thickened longitudinal section (5), with which simultaneously over substantially the entire contour sheath (19) of this section (2) a counter-force (29) is exerted so that, with the progressive deformation during upsetting, the total volume of the longitudinal section that is deforming, remains substantially constant. In this thickened section (5) a flattened zone (8) can subsequently be applied in order to realise a final shape (10) such as an opening (26). The invention concerns in particular also the use of a deformation line (40) for manufacturing a heddle for weaving looms.

19 Claims, 3 Drawing Sheets

(56) References Cited

U.S. PATENT DOCUMENTS 3,867,832 A * 2/1975 Rut .................................. 72/399
4,791,025 A * 12/1988 Hiromori et al. ............. 428/379
5,842,267 A * 12/1998 Biederman et al. ............. 29/558

FOREIGN PATENT DOCUMENTS

| | | |
|---|---|---|
| DE | 127747 C | 1/1902 |
| DE | 1268941 B | 5/1968 |
| DE | 4416472 A1 | 11/1995 |
| FR | 2695578 A1 | 3/1994 |
| JP | S4513703 | 5/1970 |
| JP | 61193739 A | 8/1986 |
| JP | S63174935 | 11/1988 |
| NL | 297377 A | 5/1964 |

OTHER PUBLICATIONS

Response to JPO Office Action mailed Jul. 3, 2012 for corresponding Japanese patent application.

* cited by examiner

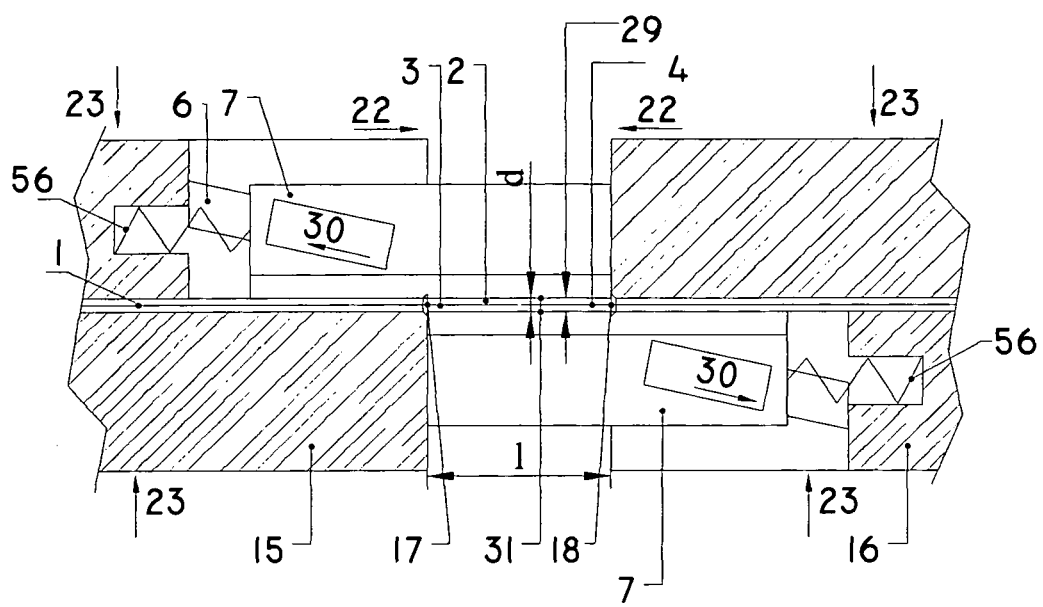
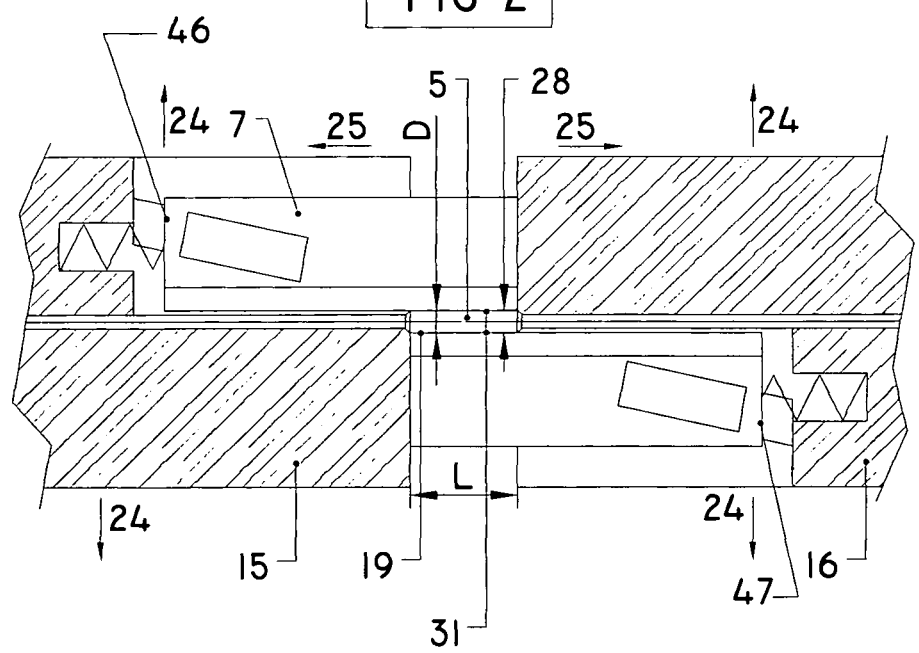

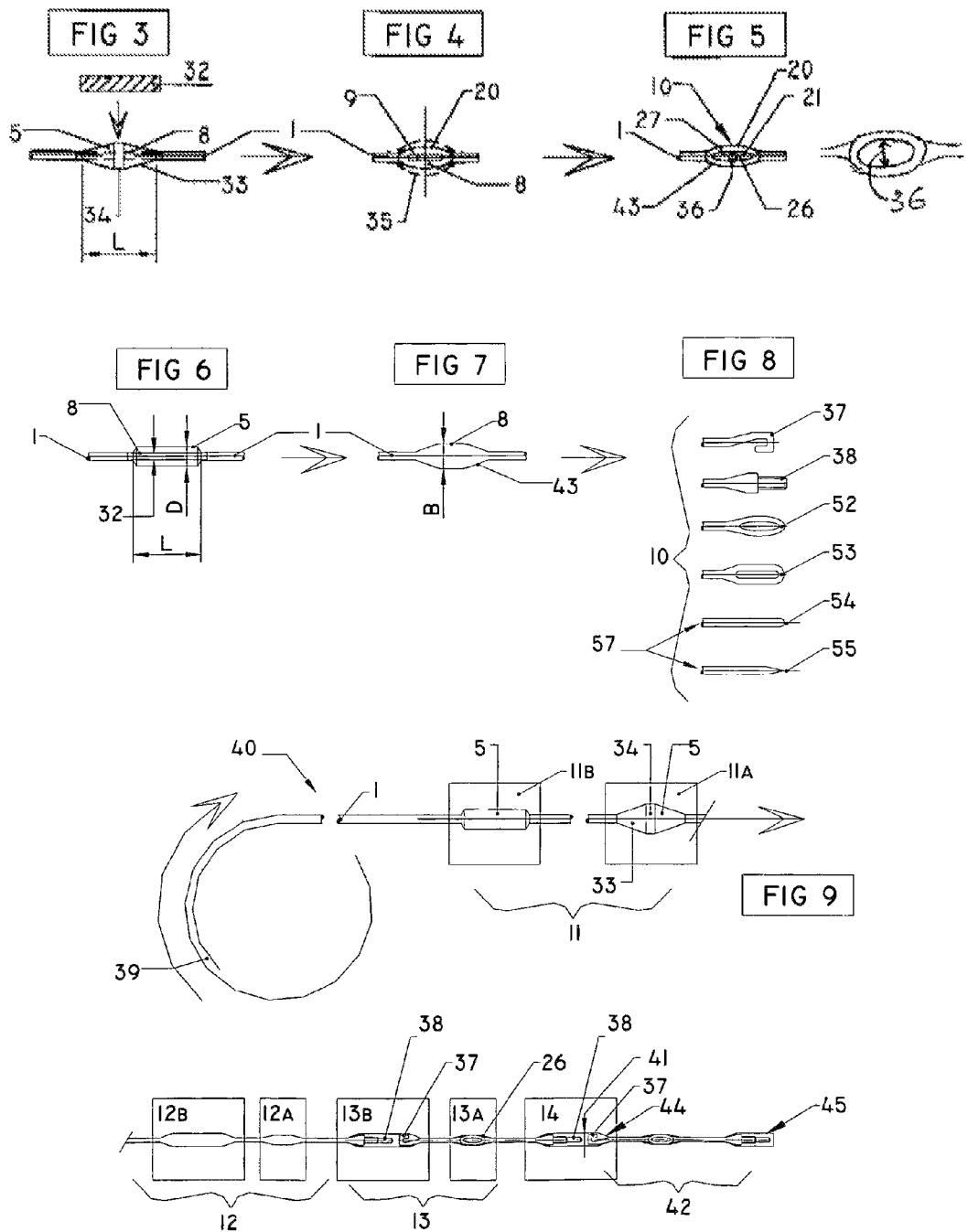

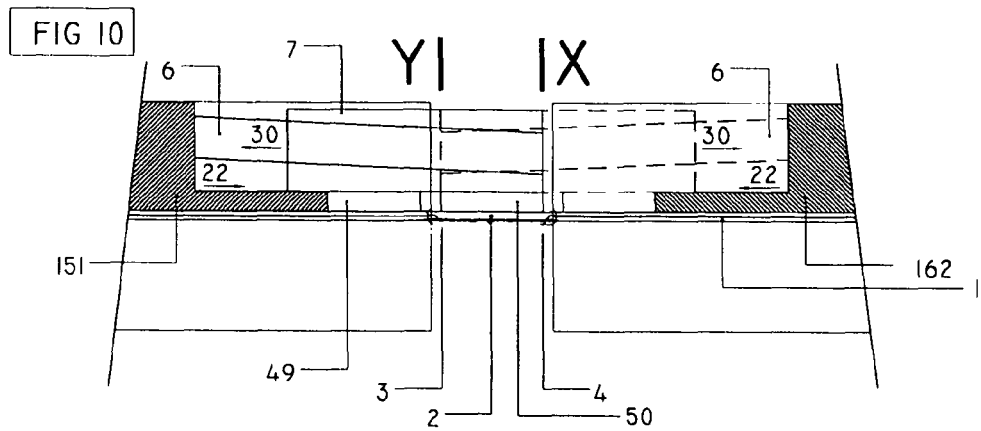
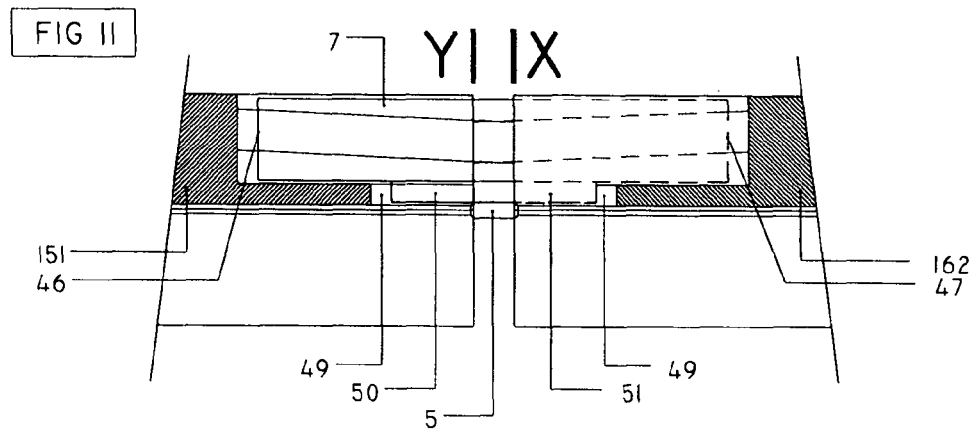
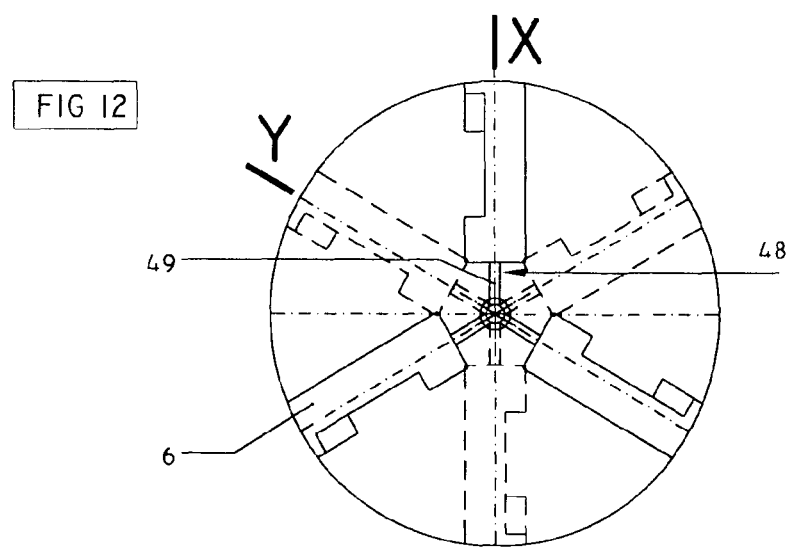

METHOD AND APPARATUS TO DEFORM THE CROSS SECTION OF ONE OR MORE LONGITUDINAL SECTIONS OF AN OBLONG OBJECT

This application claims the benefit of Belgian patent application No. 2007/0109, filed Mar. 14, 2007, which is hereby incorporated by reference in its entirety.

TECHNICAL FIELD

The invention relates to a method and an apparatus to deform the cross section of one or more longitudinal sections of an oblong object as well as the resulting deformed object and a number of its applications. The oblong object according to this invention in particular mainly consists of relatively hard material and can e.g. be a metal or a thread of synthetic plastic material.

BACKGROUND ART

For a number of applications, there is a need for oblong objects with a practically constant cross section, such as wires, bars, laths, pipes, profiles and compact wire bunches, in particular cables that have to be extensively crosswise deformed in certain zones along their length, e.g. flattened and/or perforated, and in which the object should preferably be at least as strong in those zones as elsewhere. In the past, suggestions have been made to add a considerable amount of hard but plastically deformable material in these zones and in one way or another join it under pressure with the object or with separately connectable parts of it into deformed cross sections in deforming moulds. This however is a technically quite complicated and rather expensive solution.

SUMMARY

Consequently, the need has now risen to have oblong objects consisting of only one hard material (without deformable additional material) that have enough strength along each sector of their length, but in which along their length considerably deformed, e.g. considerably thinned longitudinal sections are locally present. Likewise, it is sometimes required that the object volume is larger per length-unit in these thinned sections than elsewhere; amongst other reasons to be able to realise sufficient strength at that section. In other words, for certain applications it is necessary to possess a considerably larger strength over longer sections of an oblong object—and not necessarily near the end of this object—and to largely maintain that strength in those sections, possibly with a local increase in volume (per length-unit) in those longitudinal sections. The present invention aims at fulfilling this requirement.

In addition, practice necessitates that the deforming process allows a certain degree of flexibility so that a significant number of pre-defined deformation states can be realised in the afore-mentioned longitudinal sections. Hence, the method and the apparatus according to the invention have to be programmed and accurately controlled to that end. The invention also aims at realising in at least part of the deformed longitudinal sections specific, e.g. hardening or consolidating crystal transformations or microstructures that may additionally increase the resistance against e.g. a cyclic loading and that may therefore amongst other things additionally increase the fatigue resistance of the object when applying certain relatively hard materials.

An additional aim of the invention is to realise this deforming process in appropriate consecutive phases or steps, preferably in a semi-continuous or continuous process with an apparatus suitable for that purpose. The invention aims in particular at applying the method to metal wires, e.g. steel wires, that may have relatively small cross sections.

Bearing upon specific deformation states given certain applications, the invention aims at realising longitudinal sections provided with eye-shaped, slit-shaped, loop-shaped or hook-shaped openings in them, or with e.g. pin-shaped, cup-shaped or other segments in them. The deformed longitudinal sections in this can be situated at one or both ends of the object, e.g. a wire segment, and/or can be somewhere in between those ends. Such applications are frequently needed, e.g. in the textile industry for amongst other guiding devices for transporting continuous yarn. A slit-shaped opening at the end of a wire can e.g. result in or be further transformed to a fork-shaped wire end as guiding device. When this guiding device consists of two or more slits next to each other, this can result into a comb-shaped wire end.

In particular, the invention pursues an application of the method and the apparatus to manufacture warp wire for weaving looms. To this end, i.a. oval warp eyes are applied to the wires in between their wire ends.

It is known that the opening or eye in the up- and downward moving heddle provides the passage for a warp yarn of the woven fabric to be produced. The eye in the usual steel wire heddles is usually constituted by a separate oval metal ring. This small ring is tightly enclosed by the continually passing heddle wire and the assembly is consolidated by means of tin-plating. In use, the resulting tin-plated inner side of the eye is however subject to an important amount of frictional wear, caused by the transversally moving warp yarns. The tin layer wears off and causes a roughening of the side into an abrasive surface. Hence, the heddles have a limited life span and need to be replaced on a regular basis in function of the operational requirements. Given the fact that the number of warp threads in a woven fabric—and consequently the number of heddles in a loom—is very high, replacing them is a time consuming operation. These rings can also be deployed as eyelet guides for e.g. thread tighteners on amongst others winding reels for textile yarn.

Hence, it is also a purpose of the invention to provide an oblong object, in particular a wire-shaped object as guiding device for textile applications, e.g. a heddle wire or another yarn guide, in which this substantial disadvantage of low wear resistance is avoided.

According to the invention, these needs are approached or met by providing a method and an apparatus for deforming the cross section of at least one longitudinal section of an oblong object consisting predominantly of a relatively hard material in which this undeformed section is clamped near its ends by clamping devices that have their faces facing each other and that is subsequently upset in a controlled way by means of an axial pressure force in between these faces into a predefined shortened and thickened longitudinal section while at the same time an inwardly directed counter pressure is exerted along substantially the entire contour sheath of this undeformed section while shortening by means of upsetting into the predefined thickened section, in order to ensure that the total volume of the deforming longitudinal section bounded by this contour sheath and the mentioned faces remains substantially constant during the progressive deformation. The aforementioned inwardly directed counter pressure along the contour sheath is in most cases not a genuine additional force but only a counterforce that guarantees that the progressive deformation proceeds correctly and is constantly guided onto the gradually outward moving contour sheath in such a way that the longitudinal axis of the thickened section substantially continues to coincide or substantially coincide with the one of the undeformed or non deformed section.

When referring to relatively hard material in here, we mean a material that is little or poorly compressible to a smaller volume but that is significantly plastically deformable in a cold or hot state under relatively high pressures and without breaking; in other words that has a relatively high pressure modulus, such as metals or plastics, and that is not brittle. The material may be a metal, e.g. steel and more in particular a high carbon steel alloy or a stainless steel spring wire. The oblong object to be deformed is e.g. a steel wire with e.g. a circular or rectangular cross section. The invention is preferably aimed or intended for wires with a cross section surface in between 0.5 mm$^2$ and 80 mm$^2$. The upsetting can take place cold (room temperature) as well as hot. When upsetting hot, the axial upsetting pressure needed is lower than with upsetting cold; for metals however we do then have an extra need for heating energy by means of e.g. electrical induction. When the relatively hard material is a plastic, then "engineering plastics" can be considered. The upsetting of the synthetic plastic material will be facilitated by heating it up properly to soften the said material before and/or during the mechanical deformation process.

An important aspect of the invention relates subsequently to a further deformation of at least part of the already thickened longitudinal section by means of a transversal pressure operation with e.g. appropriate punches, preferably in a die or mould, into a more or less flattened zone. In this zone, subsequently an opening can for instance be produced, in particular an oval eye, to realise a longitudinal section with a desired final shape. This opening in the final shape can also be of another shape or include a slit-shaped, loop-shaped or hook-shaped and/or pin-shaped or cup-shaped segment. Loop is here intended among other things as an eye at the end of the oblong object. According to an additional aspect, at least part of the resulting longitudinal sections with final shape can also be at least locally hardened, amongst other things to increase its wear resistance. Hardening can also take place with known treatments such as laser treatment, nitrating, cementating, applying very hard wear-proof top coats such as DLC, DLN, etc.

According to another important aspect, the invention also provides in the preferably automized feed or supply and transit or transmission of the oblong object to be deformed to and through e.g. a deformation line with successive work stations for the possibly continuous or semi-continuous deformation of longitudinal sections in sequential steps to their desired final shape by means of upsetting, flattening, etc. and subsequently in the separation of the object into pieces with adequate lengths, e.g. in between or at the level of the said longitudinal sections. The successive work stations hence include at least one upsetting station, at least one flattening station, at least one pressing station for the application of a final shape and a cutting station. The process in accordance with the invention in sequential steps has in particular an important application in e.g. the production of heddles for weaving looms. According to an important aspect, the invention also allows to deform and treat multiple oblong objects, e.g. wires, almost simultaneously or parallel next to each other in order to distinctively increase the productivity of the process. The invention thus provides in particular methods that are more specifically defined i.a. in claims 8 to 17 and as explained further on.

According to the invention, the apparatus for carrying out this method includes in particular clamping devices that have their faces facing each other to clamp and upset the object in between the ends of the longitudinal section to be deformed, means to exert an axial pressure on the longitudinal section in between the named opposed faces to shorten and thicken this longitudinal section with the help of these clamping devices by means of upsetting and movable counter-pressure means, that extend near the contour of the longitudinal section to be deformed to exert the inwardly directed counter pressure and means that ensure a cooperation between the named means for the axial pressure and the named counter-pressure means to make sure that the volume of the space for the material to be upset, bounded by the said faces and the said movable counter-pressure means, remains substantially constant.

The invention also relates to the oblong objects themselves, e.g. the plastic or metal wires and wire segments, obtained in accordance with one or other described method, the objects being provided with at least one deformed longitudinal section with a flattened zone or with a final shape. The invention relates in particular to such objects or wires in which the cross section shape of this longitudinal section differs from the cross section shape of the rest of the wire or object and in which in between both section shapes a substantially fluently changing transition zone is present. Therefore, areas along the wire with a lesser strength (e.g. welds or other connections) are better avoided.

The longitudinal segment out of the object, in particular a stainless steel spring wire segment, can be provided with a said deformed longitudinal section near at least one of its ends. When said segment is applied as heddle for looms it will preferably have a deformed longitudinal section at both ends, in which at least one of these longitudinal sections will have another shape or opening than an oval eye and in which furthermore in between these ends a deformed longitudinal section shaped as an oval eye is present, bounded by a ring. If so required, the plane of the oval eye in this heddle may form an angle with the plane of at least one of the other openings in the sections near the heddle ends.

Finally, regardless of the specific method and apparatus, the invention provides oblong objects, in particular of metal, with deformed longitudinal sections in which in at least part of the final shapes of these sections, certain microstructures are present as a result of e.g. a certain upsetting and/or flattening and/or hardening treatment that may produce a hardening and/or consolidating effects in those sections.

BRIEF DESCRIPTION OF THE DRAWINGS

Further details of the invention will be clarified referring to an embodiment and applications, illustrated in the attached figures and an example in which additional characteristics and advantages of the method, apparatus, obtained product and applications hereof will be described. Obviously, the invention is not limited to this embodiment.

FIG. 1 schematically illustrates a wire in the upsetting apparatus right before upsetting.

FIG. 2 shows this wire with a shortened and thickened longitudinal section, obtained at the end of the upsetting process.

FIG. 3 is a front view of an embodiment of an upset longitudinal section with subsequently (in dotted line) a flattened zone with an oval contour after applying a transversal pressure operation.

FIG. 4 is a top view of the embodiment in FIG. 3 with the application of an initial split or slit in the oval zone as an intermediate step in realising the desired final shape.

FIG. 5 is a top view of FIG. 3 with the oval zone as final shape after pressing open the split shown in FIG. 4.

FIG. 6 illustrates an embodiment of a cylindrical upset longitudinal section that is more or less flattened out to an almost rectangular zone.

FIG. 7 is a schematic top view of FIG. 6.

FIG. 8 shows six possible final shapes: a hook and a pin or a loop, that can be applied in the somewhat flattened rectangular zone, or a thickened end portion that terminates in a blunt or sharp needle like extremity.

FIG. 9 schematically represents consecutive work stations in a continuous process of upsetting a longitudinal section into the appropriately cut wire length with its final shape.

FIG. 10 relates to an embodiment of the apparatus for controlled upsetting of a longitudinal section of a round wire right before starting the upsetting operation.

FIG. 11 relates to the same apparatus as FIG. 10, but with the upset final situation.

FIG. 12 is a cross section of the apparatus according to FIG. 10.

DETAILED DESCRIPTION

The circular round wire 1 with a diameter "d", outlined in FIG. 1, includes an undeformed longitudinal section 2 with a length "l" that can be considerably longer than the length "L" of the upset, shortened, cylindrical longitudinal section 5 as shown in FIG. 2. Because of the shortening, the upset section 5 thickens up to a diameter "D". The volume of section 2 before upsetting is according to the invention preferably substantially equal to that of section 5 after upsetting this undeformed section 2 in between its ends 3 and 4. With a shortening in which L is about one third of "l" the thickness D in section 5 becomes roughly 1.5 to 1.7 times d.

The upsetting, illustrated in FIGS. 1 and 2, takes place in between the faces 17 and 18 of block-shaped clamping devices 15 and 16 that have adequate recesses in their surface. Firstly, these clamping devices are pushed towards one another, crosswise around the wire surface (according to arrows 23 in FIG. 1). The wire is, in doing so, adequately enclosed and clamped by them. Subsequently, the in this way clamped wire ends 3 and 4 are lengthwise pushed towards one another (according to arrows 22) in between the respective faces 17 and 18.

To guarantee that the upsetting operation proceeds correctly and that in the thereby gradually deforming longitudinal section 2 there is among others no buckling deformation instead of an upsetting, it is necessary to provide an appropriate counter pressure or counterforce (arrows 29) along substantially the entire contour sheath 19 of this section 2. This inwardly directed more or less radial counter pressure 29 is preferably adjusted in such a way that with a gradual shortening to a predefined thickened section 5, shown in FIG. 2, the counter pressure means or counterforce means 7 move (more or less radially) outward in a controlled way (according to arrows 28). This degree and speed of controlled moving outward is according to the invention preferably adjusted in such a way that the total volume of the thickening longitudinal section, permanently bounded by the contour sheath 19 and the faces 17 and 18, remains substantially constant. The co-action or cooperation of the counter pressure means 6 and 7 with the clamping devices 15 and 16 will be clarified when discussing the apparatus in FIGS. 10 and 11. We can here suffice by mentioning that the counter pressure means 6 and 7 include adequately shaped and fittingly placed gliding pieces 7 that backward-sloping move up in complementary grooves 6 in the clamping devices 15 and 16 according to arrows 30 in FIG. 1 when these clamping devices move toward one another according to arrows 22 during the upsetting operation. During this moving up, the pressure planes 31 of the gliding pieces 7 that are facing each other, adequately move outward around the contouring plane 19 of section 2 in order to allow the gradual and controlled thickening towards the thickened section 5. In most cases, an adequate compression spring loading 56 or similar is provided against the end surfaces 46 and 47 of the gliding pieces 7, in particular to get the gliding pieces 7 back into their starting position after ending the upsetting operation, which is when opening the upsetting mould for a next upsetting cycle of a new to be deformed longitudinal segment.

The wire with the thus upset section 5 is then ready for a further deformation phase, in particular a flattening of these sections according to another aspect of the invention. It can however also relate to another deformation, e.g. a bending, whether or not linked to a flattening. The clamping blocks 15, 16 are subsequently moved away from each other again according to arrows 24 in FIG. 2 in order to transit or transport the wire to a next deformation station. They are also laterally moved away from each other (arrows 25 in FIG. 2) onto the appropriate distance "l" in order to receive a new section 2 to be upset and to resume the upsetting cycle in the upsetting station.

FIG. 3 is a frontal outline of an accordingly flattened and thinned zone 8 (dotted line) by means of exerting a transversal pressure 32 on the in advance thickened section 5, e.g. in a die or mould. This may take place according to the principles, known as such, of deformation by pressing in adequate or suitable shaping moulds by means of adjusted shaping stamps or punches. The thickened section in FIG. 3 consists here of two tapered ends 33 connected by a thicker middle or central section 34. The flattening can result in e.g. a local thinning to about ⅓ of d. In the top view according to FIG. 4, this leads to e.g. the deformation of the thickened section 5 of FIG. 3 to a disc-shaped zone 8 with a more or less oval outer contour 20. The inner wall of the die cavity may be shaped according to the dotted line 35.

In a consecutive step, outlined in FIG. 4, an initial split or slit 9 can be pressed in centrally in between two opposed cutting stamps as a pre-shape for shaping an oval-shaped eye 26 later on. This eye is shown in FIG. 5 and is surrounded by a ring 27. The eye 26 is obtained by pressing open split 9 further on in a controlled manner with a stamp according to arrows 36. The outer contour 20 of the eye hereby approaches the outlined dotted line 35 in FIG. 4. At the same time, a preferably fluently changing transition zone 43 is realised in between the final shape 10 and the bounding non-deformed parts of the object 1.

Finally, the final shape is obtained by appropriately calibrating the cross section of the ring 27, preferably into a rounded shape for the longitudinal section with eye 26. In principle, these steps are known in moulding technology. For this calibration into the rounded final shape of the ring 27, the outer contour 20 as well as the inner contour 21 are preferably both subject to a rounding operation. In doing so one has a choice: either a substantially circular round cross section of this ring 27 or an oval round section. The major axis of that oval can be e.g. perpendicular to the plane of the eye 26 or can be parallel to it. This is thus an example of the formation of a heddle eye. It is also possible to apply dies in such a way that the opposed parts of the ring 27 on both sides of the eye 26 are not entirely in the same plane as known from e.g. WO 0055407.

For the production of e.g. a hook-shaped end 37 and/or a pin-shaped end 38 to a heddle, shown in FIG. 8, one can start from e.g. a by means of upsetting cylindrically thickened section 5 with diameter D and length L, as suggested in FIG. 6. The flattening operation under a transversal pressure according to arrows 32 produces e.g. a substantially rectangular section 8 with width B, as shown in FIG. 7. The deformation under pressure in a following mould to a longitudinal section such as a hook 37 or a pin 38 or both or a loop 52 or 53 with another non-oval opening may take place with moulding techniques that are known as such. Afterwards, a screw thread can be applied to the pin end 38 in order to attach e.g. a loading member for the heddle. As an alternative thickened wire end portions 57 with either a blunt extremity 54 or with a sharp needle like extremity 55 can be produced.

The degree of upsetting is obviously chosen in function of the required length L for a sufficient possibility of expanding laterally afterwards in e.g. the flattening operation into an adequately flattened and hence thinned zone 8. The larger D/d for a predefined L, the longer length l of the corresponding longitudinal section 2 to be upset will thus have to be. This allows in particular to maintain a sufficient strength in the considerably flattened zone, more specifically by realising a local increase of volume in that place. Indeed, the volume per length-unit of that thinned section will generally have been increased in comparison with the volume of the undeformed wire 1 per equal length-unit, among other reasons because of the presence there of a much larger width B (FIG. 7).

In the schematic arrangement of a deformation line 40 according to FIG. 9 for the production of an oblong object 1, more in particular a heddle 42, we start off with a wire reel 39 from which the wire is unwound and fed to a first work station: an upsetting station 11*a*. In that, an undeformed longitudinal section 2 is clenched and upset near its ends 3 and 4 on the in advance programmed length l into e.g. a longitudinal section 5, 33-34 as shown in FIG. 3 according to the method described herein before. Subsequently, another undeformed longitudinal section 2 is similarly clenched and upset in station 11*b* into e.g. a cylindrical section 5 according to FIG. 6. The wire with the different thickened sections 5 is consecutively transmitted to the respective flattening stations 12*a* and 12*b* for the possibly simultaneous realisation of the flattened sections 8, shown in FIG. 7, resp. in FIG. 4. In the next step, the oval heddle eye 26 is applied in the pressing station 13*a* and results in the final shape 10 according to FIG. 5.

Practically simultaneously, the realisation of the hook 37 and the pin 38 as final shape can take place in the pressing station 13*b*. Finally the division in heddles with a central eye 26, final hook 37 and final pen 38 takes place in the next step in the cutting station 14. The completion or finishing of the contour of the hook 37 and the pin 38 and a possible hardening of the central opening of the eye may conclude the manufacturing.

Said hardening and finishing can also be carried out after the pressing step (in station 13) and before the cutting through in station 14. The cutting through according to FIG. 9 takes place at the spot indicated by the arrow 41 in the cutting station in the short flattened part 8 in between the pin 38 and the hook 37.

In conclusion, we have clarified a method here to manufacture a wire segment, in particular a metal wire segment 42 shaped as a heddle for looms in which the object 1 is supplied or delivered in consecutive steps to an upsetting station 11*a*, respectively 11*b* for one or more longitudinal sections 2 to be deformed, and that after the upsetting operation into their thickened section 5 are transmitted to a flattening station 12*a*, respectively 12*b* to realise the said flattened zone 8 and to a pressing station 13*a* to apply a pre-opening 9 and an oval opening 26 in the flattened zone 8, respectively 13*b* to apply another deformation 37, 38 in another flattened zone 8. Afterwards, the object with the in this way deformed longitudinal sections with final shape 10 is divided in a cutting station 14 into metal wire segments 42 with adequate lengths between said deformed longitudinal sections with final shape 10.

The deformation line 40 to manufacture this heddle thus consists of at least one upsetting station 11 provided with clamping devices 15, 16 with faces 17, 18 facing each other to clamp and upset the object 1 in between the ends 3, 4 of the longitudinal section 2 to be deformed. In addition, the station 11 comprises means to exert an axial pressure 22 on the longitudinal section 2 in between the said opposed faces to shorten and thicken this longitudinal section by means of upsetting and using movable counter pressure means 7 that extend near the contour sheath 19 of the longitudinal section to be deformed in order to exert an inwardly directed counter pressure 29. The station 11 also consists of means 6 that ensure a cooperation between the said means for the axial pressure 22 and the said counter pressure means 7 so that the volume of the space for the metal or plastic to be upset, bounded by the said faces and the said movable counter pressure means, remains substantially constant.

The deformation line comprises furthermore at least one flattening station 12 with moulding means 32 for a controlled transversal pressure operation and at least one pressing station 13 with moulding means to produce appropriate openings 9, 26 and for other deformations 37, 38 and a cutting station 14 with cutting means 41. Finally, the deformation line comprises the means necessary for a programmed step by step transit or transmission of the heddle wire 1 to be deformed through this line till past the cutting station 14 and of means for the appropriate crosswise putting in place and removal or take-away of the said clamping devices 15, 16; of the various moulding means for the flattening pressure 32 on the one hand and in the pressing stations 13 on the other hand and of the cutting means in the cutting station in the work stations 11, 12, 13, 14.

FIGS. 10 and 11 schematically illustrate a longitudinal section view of the upper half of an apparatus for upsetting a longitudinal section 2 (in FIG. 10) of a round, in particular a circular round wire 1 into a thickened, substantially circular cylindrical longitudinal section 5 in FIG. 11. A schematic cross-section view of the solid cylindrical clamping blocks 151 and 162 of the apparatus (lower and upper half) is shown in FIG. 12. In FIG. 10, these clamping blocks 151 and 162 are in their starting position right before upsetting.

In FIG. 12, near the centre 48 of the clamping blocks, radial directed recesses 49 are shown in which longitudinal ribs 50 can move (slide) lengthwise along the apparatus. These ribs constitute the underside or base of the gliding pieces 7 that can move up backwards during upsetting according to arrows 30 in the complementary, also radial directed grooves 6. Actually, along the entire contour of the apparatus, six radial grooves 6 for gliding pieces 7 have been provided. Three grooves are in the left block 151 and constitute a 120° angle among each other. The three similar other grooves (in dotted line) are in the right block 162 and are alternating in relation to the grooves in the left block 151.

During upsetting, the blocks 151 and 262 move toward each other up until the end position of FIG. 11. The three left gliding pieces 7, under a 120° angle, and with one of which in alignment with the illustrated vertical axis X, move up in clamping block 151. The three right gliding pieces 7 with longitudinal ribs 51 (in dotted line), of which one in alignment with axis Y, analogously and simultaneously move up in clamping block 162. In this way, the wire surface plane 19 of section 5 remains firmly fitted in between the six radial longitudinal ribs 50 and 51, as can be deducted from FIG. 12. Consequently, the object (the wire) is practically completely enclosed. During this upsetting, the ribs 50 and 51 appropriately move outward radially in order to allow the thickening to section 5.

EXAMPLE

Starting from a round stainless steel spring wire with diameter d=0.9 mm, in order to shape a heddle eye, a length l=12.50 mm thereof was upset to a thickened section 5 according to FIG. 3 with L=5.5 mm and a thickness D of about 1.5 mm in the middle section 34. The subsequently oval-shaped flattened section 8 (FIG. 4) had a thickness of about 0.6 mm. The major axis of the final oval eye 26 (inner side 21 of the ring 27) was almost 6 mm long and the length of the minor axis was almost 3 mm. The length of the minor axis of the outer side 20 (hence the width) of the ring 27 was about 5 mm.

Obviously, the shape of the thickened section 5 can be adapted as desired. Instead of a shape 33, 34 as in FIG. 3, oppositely a diabolo shape or a spherical or cubic shape may be chosen. The object doesn't need to be a round wire but may have another cross section profile. The application of these and other variations in the method and the apparatus are assumed to be part of the invention.

The invention claimed is:

1. A method for deforming a cross section of at least one longitudinal section of an oblong object consisting predominantly of relatively hard material, comprising:
    clamping the at least one longitudinal section near its ends with clamping devices with faces facing each other and subsequently
    upsetting the at least one longitudinal section in a controlled manner by an axial pressure force in between the faces into at least one predefined shortened and thickened longitudinal section and simultaneously
    exerting along practically an entire contour sheath of the at least one longitudinal section an inwardly directed counter pressure by counterpressure means in such a way that, with progressive deformation during shortening by upsetting to the at least one thickened longitudinal section, the total volume of the at least one longitudinal section to be deformed, bounded by the contour sheath and the faces remains substantially constant while said counter-pressure means move outward in a controlled manner.

2. Method in accordance with claim 1 in which the said hard material is a metal.

3. Method in accordance with claim 2 in which the hard material is a stainless spring steel.

4. Method in accordance with claim 1 in which the said hard material is a synthetic plastic material.

5. Method in accordance with claim 1 in which the oblong object is a wire with a round cross section.

6. Method in accordance with claim 1 in which the upsetting takes place with the at least one longitudinal section being cold or hot.

7. Method in accordance with claim 1, further comprising further deforming at least part of the at least one thickened longitudinal section by means of a transversal pressure operation into a more or less flattened zone.

8. Method in accordance with claim 7 further comprising, applying or producing an oval opening in the flattened zone in order to obtain a longitudinal section with a final shape.

9. Method in accordance with claim 7 further comprising, applying another opening, a slit-shaped opening, a loop-shaped, or a hook-shaped segment and/or a pin-shaped segment or a thickened end portion with either a blunt extremity or with a sharp needle like extremity in the flattened zone to obtain a final shape.

10. Method in accordance with claim 7, further comprising feeding said oblong object in consecutive steps to at least one upsetting station for a number of longitudinal sections to be deformed and after the upsetting operation transmitting the oblong object to at least one flattening station to apply the flattened zone in at least part of the thickened sections.

11. Method in accordance with claim 10, further comprising pressing said oblong object comprising flattened zones at at least one pressing station to apply a final shape.

12. Method in accordance with claim 11, further comprising dividing said oblong object n a cutting station into pieces with adequate lengths between the deformed longitudinal sections.

13. Method in accordance with claim 7 to manufacture a wire segment, further comprising supplying or feeding the oblong object in consecutive steps to an upsetting station, respectively for one or more of the longitudinal sections to be deformed, and transmitting the oblong object after the upsetting operation to a flattening station to realise the flattened zone and to the pressing station to apply a pre-opening in one particular place and subsequently an oval opening in the flattened zone, respectively to apply another deformation in another flattened zone and then dividing the object comprising the deformed longitudinal sections with final shapes in a cutting station in metal wire segments with adequate lengths between said deformed longitudinal sections with a final shape, shaped as a heddle for weaving looms.

14. Method in accordance with claim 8, further comprising at least locally hardening at least part of the deformed longitudinal sections with a final shape.

15. Method in accordance with claim 1, further comprising substantially simultaneously deforming several oblong objects side by side and subsequently treating them.

16. Method in accordance with claim 8 in which at least part of openings in subsequent longitudinal sections with a final shape are situated in substantially the same plane.

17. An apparatus comprising:
    clamping devices with faces facing each other to clamp and upset an object in between the ends of a longitudinal section to be deformed,
    a device configured to exert an axial pressure on the longitudinal section in between the said opposed faces to shorten and thicken the longitudinal section by means of upsetting and
    movable counter-pressure means that extend near a contour sheath of the longitudinal section to be deformed and are configured to exert an inwardly directed counter pressure and to move outward in a controlled fashion during upsetting of the object and
    a device configured to ensure a cooperation between the device configured to exert an axial pressure and the counter-pressure means to make sure that the volume of the space for the object, bounded by the faces and the movable counter-pressure means, remains substantially constant, while said counter-pressure means move outward in a controlled manner.

18. Deformation line to manufacture a heddle comprising at least one upsetting station provided with clamping means with faces facing each other to clamp and upset an object in between ends of a longitudinal section to be deformed,

- a device configured to exert an axial pressure on the longitudinal section in between the said opposed faces to shorten and thicken the longitudinal section by means of upsetting and
- movable counter pressure means that extend near a contour sheath of the longitudinal section to be deformed in order to exert an inwardly directed counter pressure and
- a device configured to ensure a cooperation between the device configured to exert the axial pressure and the counter pressure means so that the volume of the space for the material to be upset, bounded by the faces and the movable counter pressure means, remains substantially constant and
- at least one flattening station with moulding means for a controlled transversal pressure operation,
- at least one pressing station with moulding means to apply an appropriate pre-opening and an oval eye and for other deformations and a cutting station with cutting means as well as
- a device configured for a programmed step by step transmission of the object to be deformed through the deformation line till past the cutting station and
- a device configured for an appropriate crosswise putting into place and removal of the clamping devices, of the various moulding means for the flattening pressure as well as for the pressing stations and of the cutting means in the cutting station.

19. Method in accordance with claim 9, further comprising at least locally hardening at least part of the deformed longitudinal sections having the final shape.

* * * * *